United States Patent [19]

Constant et al.

[11] Patent Number: 5,044,877

[45] Date of Patent: Sep. 3, 1991

[54] MAGAZINE FOR STORING AND FEEDING FLAT ARTICLES TO BE UNSTACKED

[75] Inventors: Bernard Constant, Beaumont les Valence; Gilbert Del Fabro, La Roche de Glun, both of France

[73] Assignee: Compagnie Generale d'Automatisme CGA-HBS, Paris, France

[21] Appl. No.: 599,191

[22] Filed: Oct. 17, 1990

[30] Foreign Application Priority Data

Oct. 18, 1989 [FR] France ............................... 89 13605

[51] Int. Cl.[5] ............................................. B65G 59/00

[52] U.S. Cl. ................................ 414/798.9; 271/149; 271/158; 198/465.1; 198/717; 198/803.01

[58] Field of Search .......................... 414/798.9, 798.2; 198/465.1, 717, 803.01; 271/2, 147, 149, 158

[56] References Cited

U.S. PATENT DOCUMENTS

| | | | |
|---|---|---|---|
| 2,992,820 | 7/1961 | Tarbuck et al. . | |
| 3,236,162 | 2/1966 | Reist | 198/419.3 |
| 3,780,873 | 12/1973 | Silva | 271/149 X |
| 3,902,587 | 9/1975 | Checcucci | 198/465.1 |
| 3,966,193 | 6/1976 | Storace et al. . | |
| 4,583,633 | 4/1986 | Spiegel et al. | 198/803.01 X |
| 4,613,034 | 9/1986 | Hibi et al. | 198/731 X |
| 4,751,998 | 6/1988 | Yano | 198/465.1 |

FOREIGN PATENT DOCUMENTS

| | | |
|---|---|---|
| 0211307 | 2/1987 | European Pat. Off. . |
| 1127375 | 4/1962 | Fed. Rep. of Germany . |
| 1134030 | 7/1962 | Fed. Rep. of Germany . |
| 1254086 | 11/1967 | Fed. Rep. of Germany . |
| 2219665 | 9/1974 | France . |
| 1195550 | 6/1970 | United Kingdom . |

*Primary Examiner*—Robert J. Spar
*Assistant Examiner*—Craig Slavin
*Attorney, Agent, or Firm*—Sughrue, Mion, Zinn, Macpeak & Seas

[57] ABSTRACT

The magazine has slats for advancing flat articles to an unstacking head. The magazine comprises a first zone into which articles are loaded and along which they are advanced by removable slats, which slats are individually mounted in the first zone, being held and guided therein and also being driven therealong. The magazine also includes a second zone for stocking slats that are not in use, with the second zone being formed adjacent to the unstacking terminal portion of the first zone and being equipped for removing the slats form the first zone, and for transferring the removed slats into a stock of slats. The invention is applicable to separating postal items one by one.

20 Claims, 5 Drawing Sheets

MAGAZINE FOR STORING AND FEEDING FLAT ARTICLES TO BE UNSTACKED

In installations for processing flat articles that are presented separately from one another, the present invention relates to so-called "magazine" systems for feeding "unstackers", i.e. members for separating the articles one by one.

The flat articles may be constituted, in particular, by items of mail, such as letters in various different possible formats, post cards, and magazines.

BACKGROUND OF THE INVENTION

In conventional manner, devices for unstacking such articles essentially comprise a magazine for storing the articles in a stack and an unstacking head mounted at the end of the magazine. The magazine includes means for retaining the stacked articles and means for advancing articles towards the head to feed the head with articles which the head then takes one by one from the stack. The unstacking head may be constituted, for example, by a suction cup driven with a rocking motion to come into contact with the first article in the stack and to grasp it, and driven with a reciprocating translation motion to take the article it has grasped out from the magazine, whereupon it releases it, prior to returning to the stack. During this translation motion of the said unstacking head, the stack of articles in the magazine advances so as to position a new end article for taking in the place in the preceding article.

The unstacking head is adapted to the characteristics of the articles presented thereto for the purpose of removing them one by one without damaging them. Its positioning ahead of the stack and/or its rocking motion may be controlled on the basis of detecting the format and/or the presentation of each end article to be taken.

For the purpose of storing the articles and feeding the unstacking head, such magazines have one or more slats that hold the articles and advance them as they are unstacked.

Magazines having a single slat are used for articles that are highly uniform and not very thick, e.g. letters.

These magazines are less suitable when the articles are very varied, in particular with respect to size, with it being necessary, when loading such articles, for the length of the loaded stack to be limited. Regardless of the articles in question, each time a single slat magazine is reloaded, unstacking is stopped temporarily, and in general so is the entire installation.

In order to improve uninterrupted running time of installations, particularly when used for postal sorting, magazines are generally provided with a plurality of slats. The slats split up the stack of stored articles into elementary stacks, thereby enabling a larger overall stack to be obtained. They advance the elementary stacks simultaneously along the magazine while holding them apart. If so desired, they enable new elementary stacks to be loaded into empty spaces between slats, in general in an inlet end of the magazine distant from its unstacking end, thereby topping up the overall stack while unstacking is taking place.

In such multiple slat magazines, the slats are coupled to common drive means for advancing them along the magazine, pushing the articles in front of them. In the vicinity of the unstacking heads, the slats are retracted so as to avoid the head and they enable unstacking to take place continuously from one elementary stack to the next. These retracted slats are thus made inactive and they are recycled outside the magazine back to its inlet, where they become active again.

These magazines use an endless conveyor such as a chain for advancing the slats along the magazine and for recycling them. Mechanisms associated with the slats and with the conveyor ensure that the slats are put into the active position and held there while travelling along the magazine, and that they are retracted at the unstacking end.

In addition to the considerable mechanical complexity of multiple slat magazines, these magazines are designed with a given number of slats that are distributed round the closed circuit defined by the conveyor at intervals which are fixed or which are capable of being varied only slightly. It therefore remains relatively awkward to load an appropriate elementary stack of articles into an empty space between slats, particularly when the articles are highly varied.

The object of the present invention is to avoid these drawbacks, in particular when the articles are highly varied.

SUMMARY OF THE INVENTION

The present invention provides a magazine for storing and feeding flat articles to be unstacked, the magazine comprising:

a first base plate on which the articles are stood edgeon, and a far side wall, thereby defining a first zone in which articles are loaded and caused to advance up to an unstacking head;

slats each having a substantially vertical thrust plate for holding articles on said first base plate;

drive means mounted along said first base plate;

means for coupling the slats to said drive means;

means for holding and guiding the slats along said first base plate; and means for retracting successive ones of said slats when detected at the unstacking head;

wherein each of said slats is removable from said first base plate, and further includes a substantially horizontal flat finger connected to its said thrust plate and extending at a distance therefrom adjacent to the bottom edge of said thrust plate, the finger being suitable for insertion beneath said first base plate when the slat is mounted on said first base plate, thereby defining said means for holding and guiding the slat along said first base plate, the terminal portion of the finger being fitted with said coupling means for engaging said drive means when the slat is put into place on said first base plate.

The said finger of each slat preferably co-operates both with the first base plate and with a parallel second base plate between by being inserted between them, thereby guiding and maintaining the slat in question, and has end claws that engage between the threads of a screw for driving the slats along the first zone.

the magazine also preferably includes a slat-storing second zone formed on the front side edge of the unstacking terminal portion of said first zone and provided with means for removing said slats from said first zone.

Said second zone may include means for transferring slats removed from the first zone from their evacuation paths to a stock of slats contained therein and from which slats are taken individually by hand at will for installing in the first zone.

BRIEF DESCRIPTION OF THE DRAWINGS

An embodiment of the invention is described by way of example with reference to the accompanying drawings, in which.

DETAILED DESCRIPTION

Figure 1:
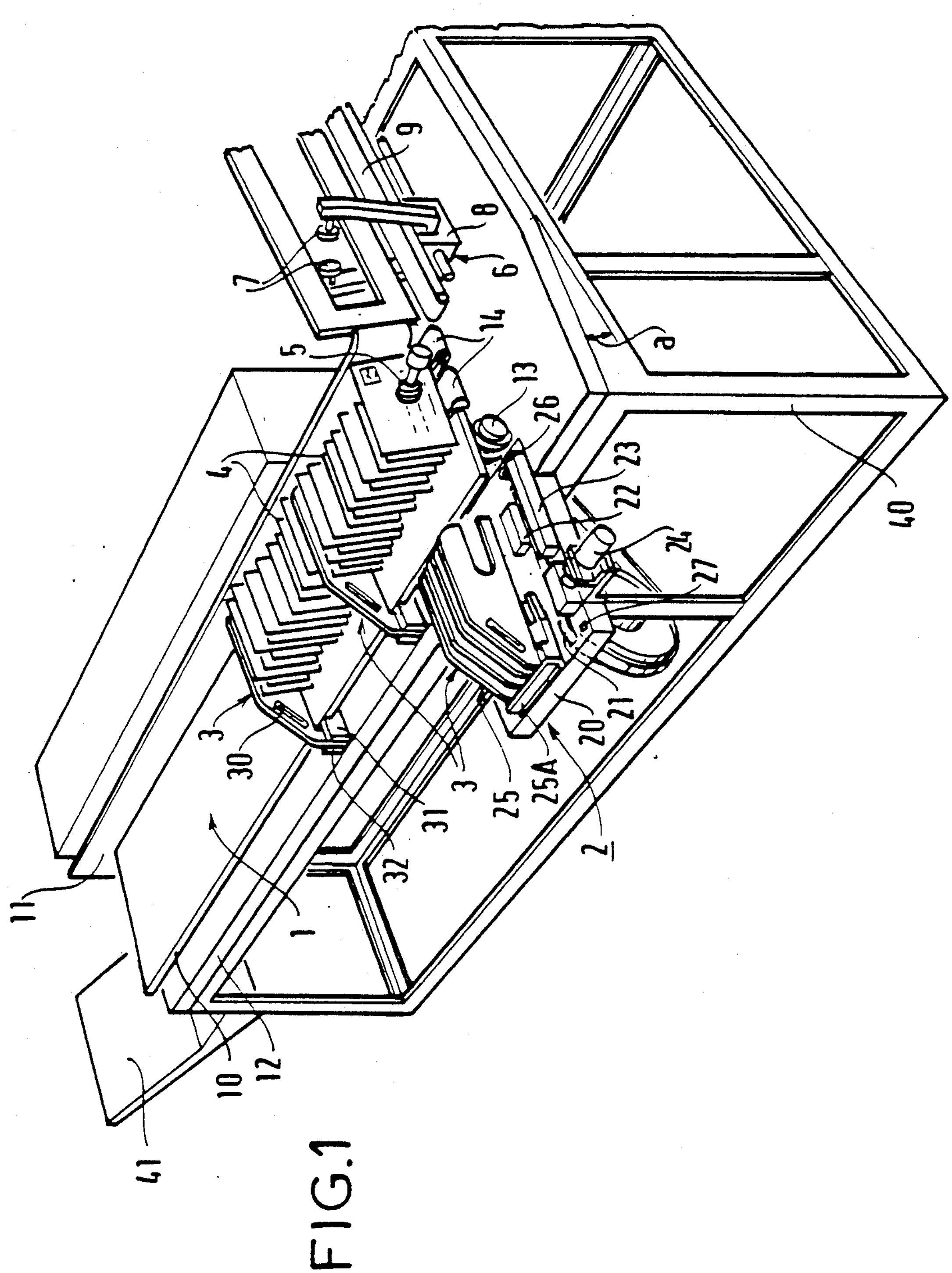
FIG. 1 is a diagrammatic perspective view of a magazine of the invention for storing and feeding flat articles to be unstacked.

FIG. 1 shows the general layout of a magazine of the invention for storing and feeding flat articles. This magazine essentially comprises two zones: a zone 1 for loading and advancing articles to be unstacked; and a zone 2 for storing slats; together with a set of slats such as 3. Some of the slats 3 in the set are shown in use in the zone 1 where they serve to hold stacks 4 of articles and to advance these stacks towards an unstacking head 5. The remaining slats in the set are stored in the storage zone 2, waiting to be used.

The zone 1 for loading and advancing articles constitutes the article magazine per se. The unstacking head 5 is mounted at the end of the zone 1 and defines the unstacking face of the magazine. It takes articles one by one from the end stack presented thereto by the zone 1 and it transfers each article it takes to an extraction assembly 6.

The unstacking head 5 is constituted, for example, by a suction cup, while the extraction assembly 6 is constituted, for example, by a conveyor 9 associated with a pair of pads 7 mounted in a clamping configuration on a carriage 8. The extraction assembly 7 is mounted on the far side of the zone 1 to receive successive articles taken by the head 5. The extraction assembly 6 and the unstacking head 5 are known per se. Since they do not constitute part of the present invention they are represented in simplified form without their respective control means, and they are not described in greater detail.

The zone 1 is defined on a top base plate 10 or base on which the articles stand edge-on, together with a far side wall 11. The top base plate 10 is preferably tilted slightly relative to the horizontal, sloping down from its near edge towards its far wall, at an angle of about 10°. The angle a in FIG. 1 represents this slope. [The terms "near" and "far" are used herein as seen by an operator tending the zone 1].

This zone 1 also includes a bottom base plate 12 parallel to the top base plate 10 and spaced apart therefrom beneath its near margin. The zone 1 also includes a drive screw 13 likewise mounted beneath the top base plate 10 and serving to drive the slats while in use in the zone 1, thereby advancing stacks of articles towards the unstacking head 5. The zone 1 is also fitted with an end conveyor 14 mounted through the top base plate 10 so as to be flush with its top face. This conveyor is close to the far side wall 11 and it extends only over a terminal portion of the zone 1, immediately before the unstacking head 5.

The slat storage zone 2 is also fitted with means for removing successive slats from the zone 1.

This zone 2 is disposed on the front side of the terminal portion of the zone 1.

It extends away from the extraction assembly 6.

The zone 2 is defined on a support 20 extending the substantially terminal portion of the bottom base plate 12 sideways. The support 20 is preferably integrally formed as a single piece with the base plate 12.

In order to remove each slat reaching the end of its stroke in the zone 1, the zone 2 is fitted with a conveyor 21 extending transversely to the zone 1 and mounted beneath the leading edge of the support 20 and flush with its top face. A short guide 22 and a long guide 23 on the support 20 extend parallel to its front edge on either side of the conveyor 21. Each slat removed from the zone 1 for storage purposes is received between them.

An actuator 24 pushes each slat as removed by the conveyor 21 into the stock of slats in the zone 2. The actuator is adjacent to the end of the slat removal stroke as defined by the conveyor 21, at which point a removed slat is fully disengaged from the zone 1. The slat in question is then pushed across the conveyor 21 so that unused slats are stacked against one another. The stock of unused slats is given reference 25. A low bracket 25A holds the stock 25 of slats. The slats 3 in this stock are thus made available to an operator for use or installation on the zone 1 whenever said zone is being fed with articles. This stock of slats is provided in reach of an operator, therefore making it easy to take a slat and put it into operation.

An end-of-stroke detector 26 detects when a slat has advanced to the end of its stroke along the zone 1, and it switches on the conveyor 21 for the purpose of extracting the slat in question. The detector 26 is mounted at the end of the long guide 23 adjacent to the zone 1, and may be constituted, for example, by a pressure detector responsive to each slat bearing thereagainst. Another detector 27, analogous to the detector 26, detects when the slat has reached the end of its removal stroke and has reached the near edge of the support 20. This actuates the actuator 24. The distance between the second detector and the zone 1 is not less than the length of the slat.

The magazine for storing and feeding articles to be unstacked is built on a frame 40. The frame is suitably covered as is the zone 2 for storing unused slats, and only a side face remains open for taking slats from the stock 25.

A service tray 41 is advantageously provided at the rear end of the zone 1 distant from the unstacking head 5. This tray serves to receive an initial stock of articles (not shown) from which successive stacks of articles are taken and loaded onto the zone 1.

A stack of articles is loaded onto the zone 1 by an operator immediately behind the stack 4 already in place, and if unstacking is taking place, there is no need to interrupt it. The stack to be loaded can be taken in a single stroke by an operator using both hands, or else the operator can take small bundles and build up a stack of bundles one behind the other behind the trailing slat in the zone 1. Advantageously, the stack or the successive bundles are jogged against an empty portion of the top base plate 10 prior to being put into place against the trailing slat. The stack as taken or as built up is then held by a new trailing slat which is taken from the zone 2 and mounted on the zone 1 which then holds the slat in place. The operator causes the far edges of the articles in the stack loaded on the zone 1 to bear against the far side wall 11 either before or after the stack is held by the trailing slat. The angle of slope a of the base plate 10 facilitates putting the articles in the stack into contact with the wall 11, thereby jogging them against said wall. The stacks of articles slide along the wall 11.

The zone 1 is thus loaded progressively during unstacking. While processing a given initial stock, and while changing from a first initial stock of articles to another, loading is performed using successive stacks that may be of different lengths. Stack lengths are adapted to the nature of the articles in the stacks.

The slats 3 are all identical. Each of them essentially comprises two portions: a top portion 30 and a bottom portion 31. The top portion 30 is constituted by a thrust plate and is referred to as such below. It serves to hold and advance a stack of articles along the zone 1. The bottom portion 31 is constituted by a flat finger and is referred to as such below. This finger serves to hold, guide, and drive the slat, not only in the zone 1, but also in the zone 2.

The finger 31 projects from a fixing tab 32 integral with the thrust plate 30. The finger extends beneath the thrust plate at a distance therefrom.

The slats 3, the zone 1 in which articles are loaded and caused to advance, and the zone 2 for storing slats are further described with reference to the following figures.

A typical slat 3 is described with reference to FIGS. 2, 4, and 5, in particular.

The thrust plate 30 is substantially vertical and is shown as being in the form of a rectangular trapezium. Its top and bottom edges are substantially horizontal, with its bottom edge being slightly longer than its top edge, which bottom edge is nevertheless slightly shorter than the width of the zone 1. The vertical edge of the thrust plate is the far edge of the slat, while the sloping edge of the thrust plate is the near edge of the slat. The edges of the thrust plate 30 have not been given references.

The fixing tab 32 extends the near edge of the thrust plate downwards beneath its horizontal bottom edge.

Figure 4:
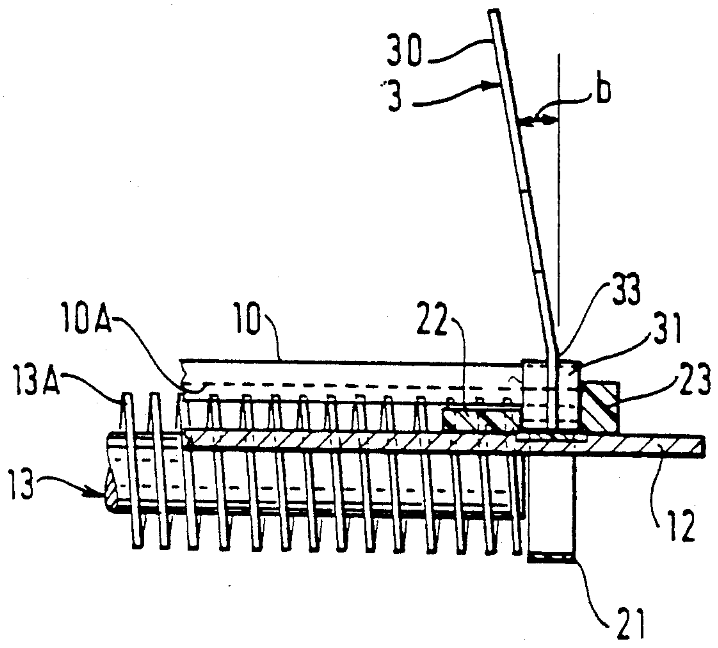
FIG. 4 is a side view showing a slat end-on at the end of its advance along the magazine, as seen looking along IV—IV of FIG. 3.
Figure 5:
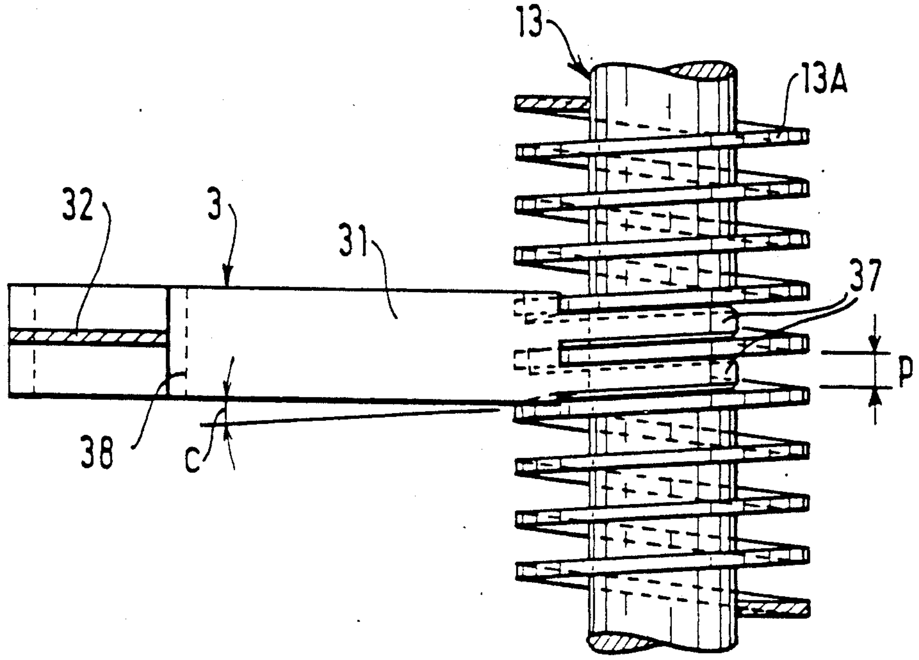
FIG. 5 is a section view through a slat on the magazine, with the section being on line V—V of FIG. 2.

Advantageously, a fold 33 substantially between the tab 32 and the thrust plate 30 causes the thrust plate 30 to slope backwards through a small angle of about 10°, which angle is marked b in FIG. 4, in particular. It enables the articles in the stack held between the slat under consideration and the preceding slat to slope through an angle that is at least as large.

In its thrust plate, the slat 3 has a long horizontal window 35 that opens out into the rear edge.

When the slat is on the zone 1, this window is level with the unstacking head. It enables a small number of articles to be taken one by one from the front of the stack by the unstacking head passing through the slat, prior to the slat itself being removed. The thrust plate may also have one or more other windows analogous to the window 35 should the unstacking face at the end of the zone 1 be constituted by an unstacking head having other components, thereby constituting an unstacking wall.

The thrust plate also includes a window 36 running parallel to its sloping near edge, the window 36 being close to said edge. This window 36 is used for grasping the slat in the hand.

The flat finger 31 of the slat extends substantially horizontally beneath the thrust plate 30 which extends generally vertically (ignoring its slope at the angle b). The fixing tab 32 is centered on the near end of the finger (FIG. 5). The length of the finger is shorter than the length of the bottom edge of the thrust plate. The thickness of the finger is equal to the width of the gap between the top base plate 10 and the bottom base plate 12 in the zone 1, as can be seen clearly in FIG. 2. By having its top face pressed against the top base plate 10 and its bottom face pressed against the bottom base plate 12, the finger serves to hold the slat relative to the corresponding surfaces of the two base plates 10 and 12 which serve as guides therefor.

The far end of the finger 31 distant from its near end receiving the tab 32 is notched. FIG. 5 shows said far end of the finger having a substantially central slot which is inclined relative to the central axis of the finger, together with two lateral cut-outs parallel to said slot.

This slot and the two cut-outs have not beem referenced, however they define two claws 37 at an angle c and of width p, said claws extending on either side of the slot. The angle c and the width p of these two claws 37 correspond to the angle c and substantially to the pitch likewise referenced p of the threads 13A of the drive screw 13 mounted beneath the base plate 10 in the zone 1 of the magazine. When the slat is mounted on the zone 1 of the magazine, the end claws 37 of its finger engage between consecutive threads of the screw 13. They contribute to holding the slat on the zone 1 and in cooperation with the screw they serve to drive the slat along the zone 1.

The finger 31 also includes a notch 38 in its near end which notch extends across the finger. This notch 38 is used for removing the slat from the zone 1 when the slat is detected as having reached the end of its stroke in this zone.

It should also be observed that the angle a given to the base plates 12 and 10 relative to the horizontal to ensure that their near side edges are higher than their far side edges contributes to retaining each slat on the zone 1.

A slat 3 may be made as a single piece, in which case the fixing tab constitutes a linking portion between the thrust plate and the finger.

Figure 6:
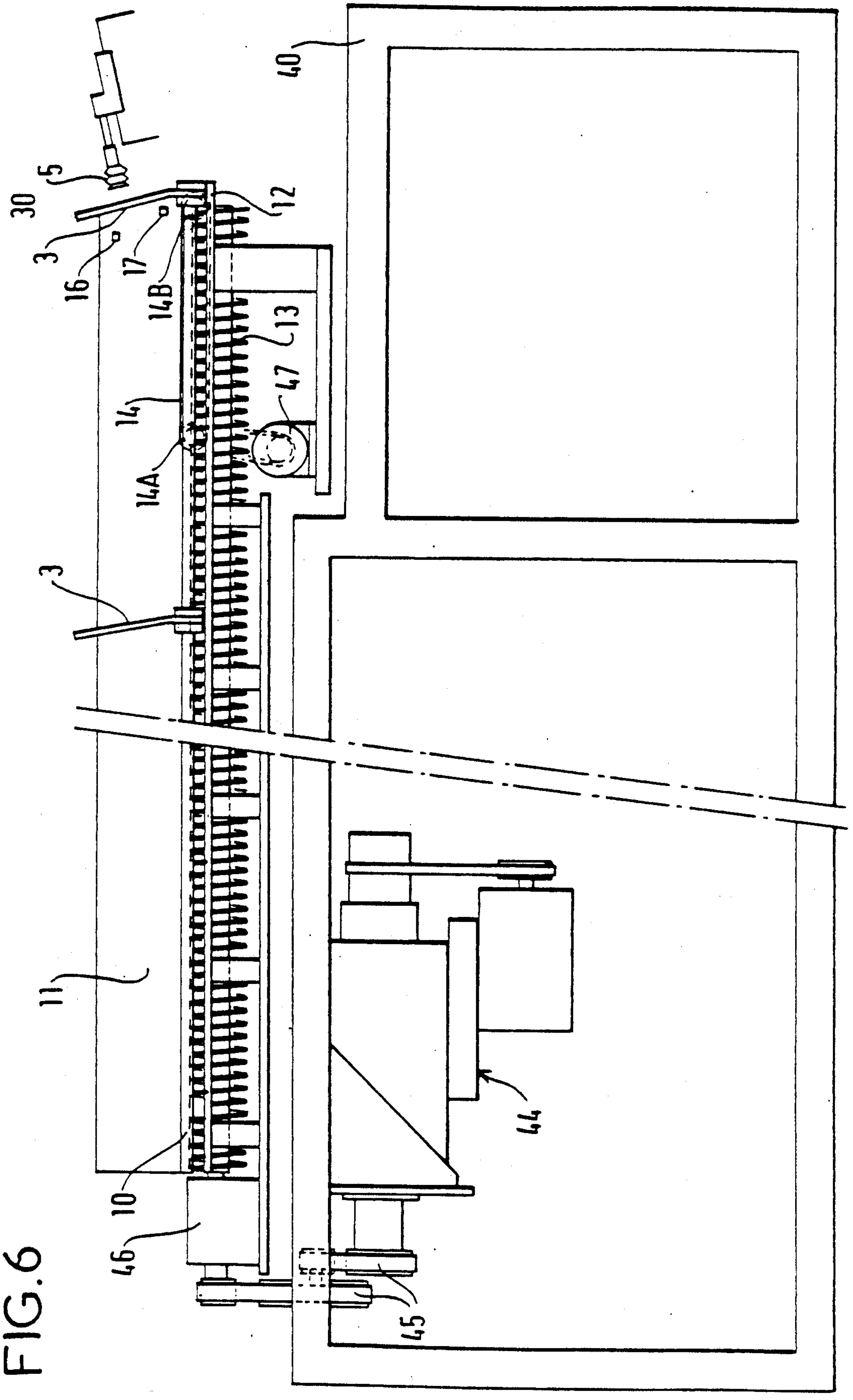
FIG. 6 is an elevation view of one of the zones of the FIG. 1 magazine.

The zone 1 in which articles are loaded and caused to advance is described in greater detail with reference to FIG. 6 which is a side view showing its length, or with reference to FIG. 4 and the righthand portions of FIGS. 2 and 3 which show its end portion where the articles are unstacked.

The bottom base plate 12 extends beneath only a portion of the width of the top base plate 10, which top base plate has a margin of increased thickness 10A beneath its near side edge and overlying the bottom base plate 12.

The drive screw 13 extends along the length of the zone 1 beneath the top base plate 10 and immediately behind the bottom base plate 12. It is driven by a motor and gear box unit 44 including a clutch and brake assembly which serves to reduce response times, particularly when the screw is stopped. The unit 44 is coupled to the shaft of the screw 13 via transmission belts 45, and it is disposed beneath the inlet end of the zone 1, at a distance from its unstacking end. The shaft of the screw is supported in a bearing 46.

The threads 13A of the screw 13 project a considerable distance from the shaft of the screw, thereby ensuring that the claws on the fingers of the slats get a good grip in the gaps between the threads. The tops of the threads come close to the bottom surface of the top base plate 10 to prevent the claws from escaping into the gap between the top of the threads and the base plate 10.

In the unstacking terminal portion of the zone 1, the conveyor 14 is constituted by two belts. These belts are mounted behind both the bottom base plate 12 and the screw 13. They are kept under tension between a common end roll 14A and a common drive roll 14B coupled to a motor 47. The conveyor 14 occupies only the terminal portion of the zone 1. It drives the articles forwards at a speed slightly faster than that imparted by the screw 13 via the slats 3.

Advantageously, two detectors 16 and 17 are mounted on the far side wall 11 substantially at the end of said wall and in the unstacking plane. The detectors define a slope at substantially the same angle relative to the vertical as the thrust plates 30 of the slats. These two detectors are used for regulating the advance of end articles for unstacking so as to present them optimally to the unstacking head, with their bottom edges leading slightly. They cause drive to be applied to the screw 13 and to the conveyor 14 so long as there is no article in front of them. When the top detector 16 detects an article, it stops the screw drive unit 44, and when the bottom detector 17 detects an article, it stops the motor 47 of the conveyor 14.

Figure 3:
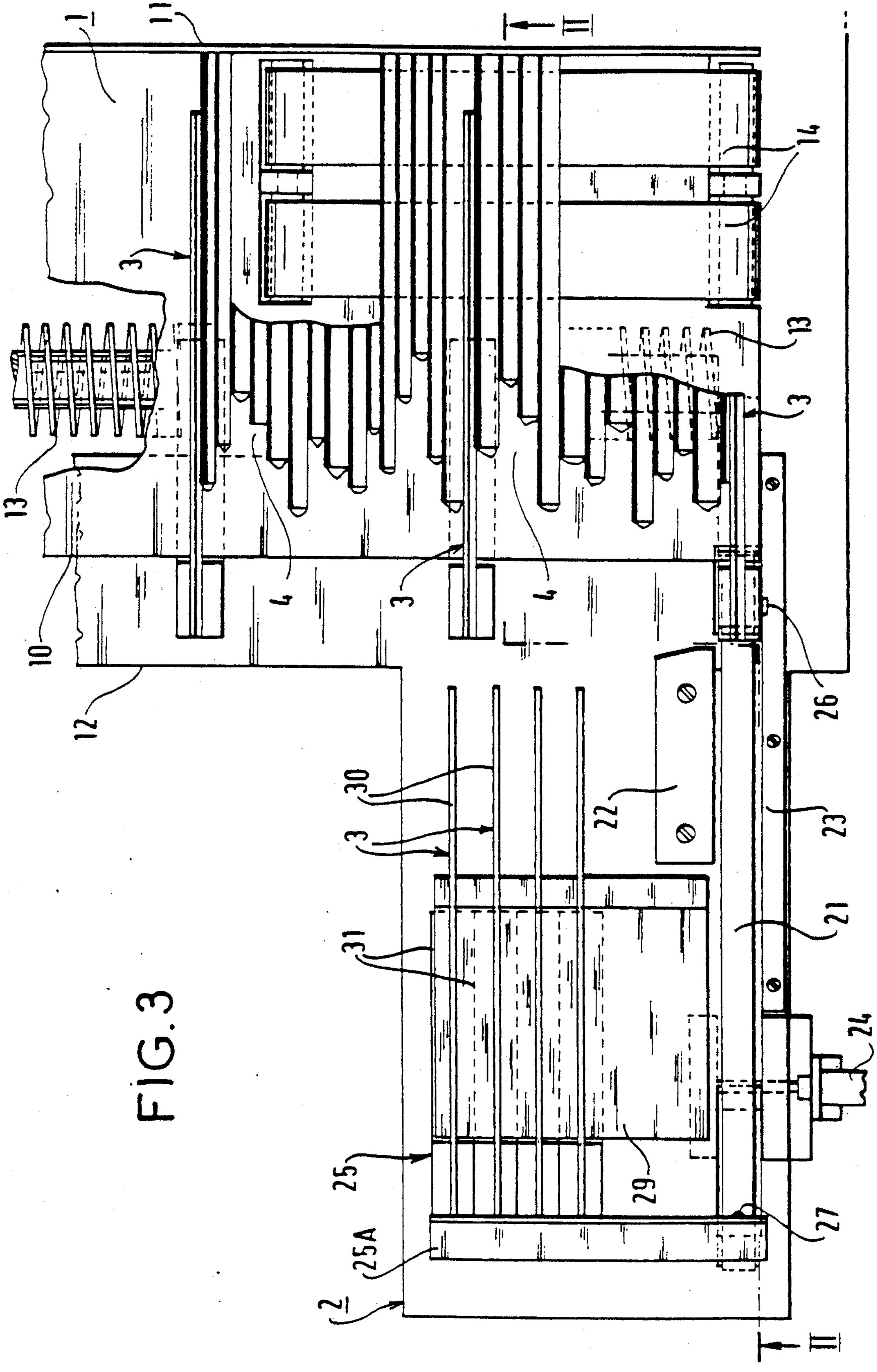
FIG. 3 is a plan view of the end portion of the magazine, with FIG. 2 corresponding to a section on line II—II of FIG. 3.

In addition, FIG. 3 shows that the long guide 23 used when removing a slat that has reached the end of its advance stroke along the zone 1, also serves as an abutment for the finger 31 of said slat at the end of its advance stroke. It thus holds the slat in this end-of-stroke position until it has been removed from the zone 1.

Figure 2:
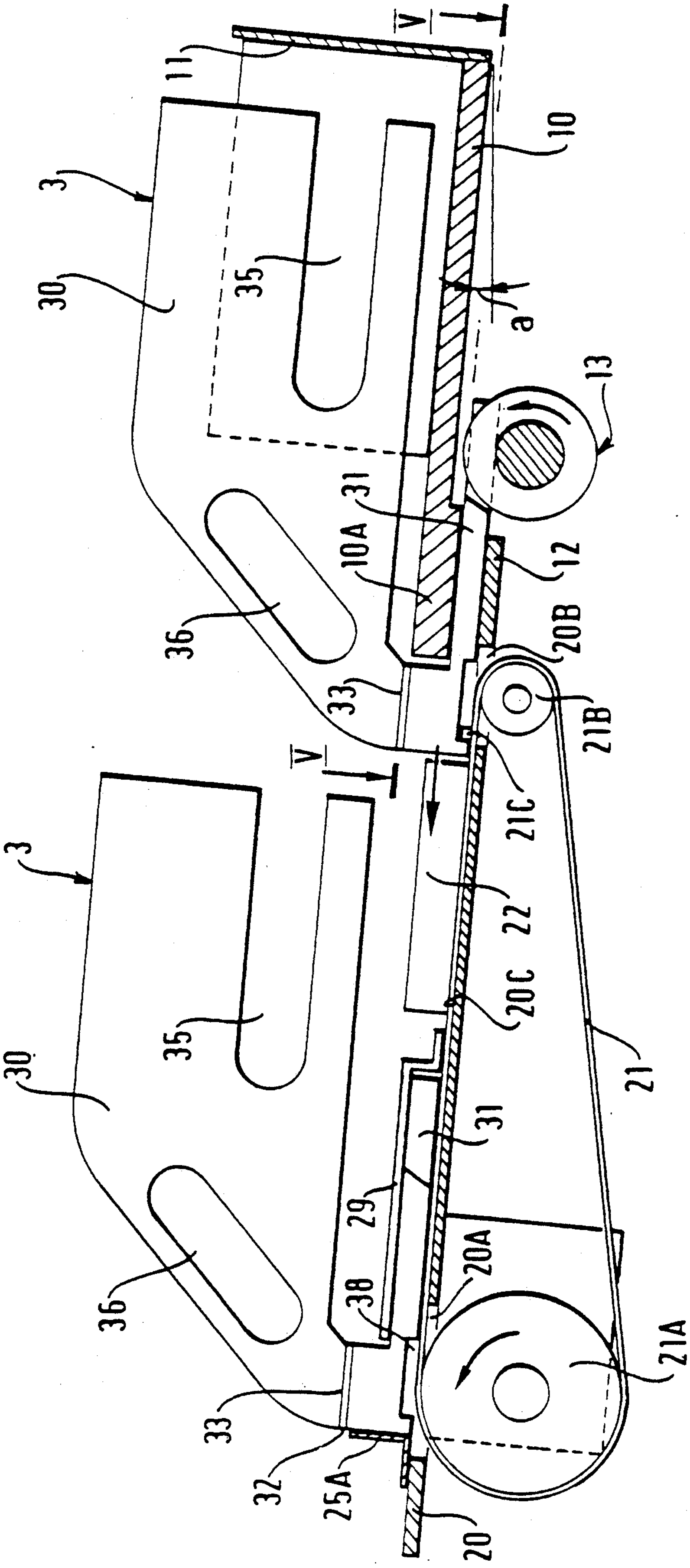
FIG. 2 is a diagrammatic view of the FIG. 1 magazine seen from its unstacking end.

The description of the zone 2 continues with reference to FIGS. 2 and 3. The conveyor 21 is likewise constituted by an endless belt held under tension between a driving pulley 21A and a return pulley 21B. The pulley 21B lies substantially beneath the notch 38 in the finger 31 of a slat in its end of advance stroke position over the zone 1. The other pulley 21A corresponds substantially to the end of the slat removal stroke.

Two windows 20A and 20B in the support 20 level with the pulleys, and a groove 20C in the top face of the support between the guide 22 and 23, enable the belt 21 to be put into place appropriately, passing from one window to the other.

The belt 21 has a projecting peg 21C on its outside face. The peg engages in the notch 38 of a finger, thereby extracting the slat from the screw 13 and removing it. The belt 21 is switched on by means of the detector 26 and it is switched off by means of the detector 27.

This second detector 27 is mounted, for example, on the bracket 25A at the end of the conveyor 21, as shown in FIG. 3.

The same detector 27 is also used for switching on the actuator 24 which pushes the slat that has just been stopped at the end of its removal stroke into the stock 25 of waiting slats.

A plate 29 fixed to the support 20 serves to guide and hold the slats as they are pushed against the stock 25. It constitutes a bracket standing off from the support at a certain distance thereabove suitable for receiving the fingers of the slats between itself and the support. It has a downwardly extending edge fixed to the support beyond the ends of the fingers.

With reference to FIGS. 2 and 3, it will be observed that the short guide 23 for guiding the slat while it is being removed does not prevent the same slat from being pushed into the stock, since the bottom edge of the thrust plate of the slat passes over the short guide.

A slat is taken from the stock merely by lifting it over the low bracket 25A, or else by directly disengaging the slat closest to the operator via the edge of the support 20 furthest from the conveyor 21.

The magazine of the present invention having removable slats that are mounted at will on the zone 1 for holding and advancing articles is particularly well suited for use in installations for sorting highly diverse articles of mail that may be in large or small format and also of various quite different weights. It enables the installation in which it is included to continue operating for long periods of time, which is particularly advantageous given that the handling of such articles and their varied characteristics require the lengths of the stacks as loaded to be kept short.

The magazine of the present application has been described with reference to a particular embodiment as shown, however it is obvious that variants are possible without going beyond the scope of the invention.

We claim:

1. A magazine for storing and feeding flat articles to be unstacked, the magazine comprising:

a first base plate on which the articles are stood edgeon, and a rear side wall, thereby defining a first zone in which articles are loaded and caused to advance up to an unstacking head;

slats each having a substantially vertical thrust plate for holding articles on said first base plate;

drive means mounted along said first base plate for moving said slats along said first base plate;

means for coupling the slats to said drive means;

means for holding and guiding the slats along said first base plate; and means for retracting successive ones of said slats when detected at the unstacking head;

wherein each of said slats is removable from said first base plate, and further includes a substantially horizontal flat finger connected to its said thrust plate and extending at a distance therefrom adjacent to the bottom edge of said thrust plate, the finger being suitable for insertion beneath said first base plate when the slat is mounted on said first base plate, thereby defining said means for holding and guiding the slat along said first base plate, a terminal portion of the finger being fitted with said coupling means for engaging said drive means when the slat is put into place on said first base plate.

2. A magazine according to claim 1, further including a lower second base plate mounted beneath the upper first base plate along a near longitudinal edge of the magazine and at a distance therefrom substantially equal to the thickness of said finger of each slat, said first base plate, said second base plate and said finger further defining said means for holding and guiding the slats.

3. A magazine according to claim 1, wherein said drive means are constituted by a screw mounted along and beneath said first base plate, and wherein said coupling means for coupling the slats to said drive means are constituted by threads of the screw having a pitch and and inclination and by terminal claws having a width and an inclination defined on the finger of each slat, whereby the width and the inclination of the claws being substantially equal to the pitch and the inclination of the threads of said screw between which they engage.

4. A magazine according to claim 2, further including a slat storage second zone formed on a near side edge of an unstacking terminal portion of said first zone and fitted with removal means for removing said slats from said first zone and into the storage zone.

5. A magazine according to claim 4, wherein said second zone comprises a support extending from said first base plate sideways from the near longitudinal edge of the magazine in said unstacking terminal portion of the first zone, with said removal means being flush with a top face of said support, and being substantially in line with an unstacking end of said first zone and defining the slat removal path, said drive means for moving said slats themselves defining the end of a slat advanced stroke substantially at said unstacking end of said first end zone.

6. A magazine according to claim 5, including a pair of parallel guides on said support spaced apart from each other by a distance which is substantially equal to the width of a slat finger and receiving between them said slat removal means, defining together therewith said slat removal path.

7. A magazine according to claim 6, wherein one of said guides also constitutes an end of stroke abutment for the slats advancing over said first zone.

8. A magazine according to claim 5, further including a first slat advance stroke detector controlling said removal means.

9. A magazine according to claim 8, wherein each of said slats further includes a notch in a bottom face of said finger, and said removal means include an endless conveyor having a projecting peg that engages in said notch in the slat finger when said slat is at the end of its advance stroke over said first zone.

10. A magazine according to claim 5, further including a second detector mounted on a second zone facing said slat removal path and at a distance from the first zone which is not less than the length of the slats in said removal path direction, said second detector serving to stop said removal means and defining together therewith the end of a slat removal stroke over said second zone.

11. A magazine according to claim 10, further including a stock of removed slats on said support, said stock being built up transversely to the slat removal path onto said second zone, and transfer means for transferring slats that have been removed into said stock, the transfer means being controlled by said second detector each time a slat is detected as being at the end of its removal stroke.

12. A magazine according to claim 11, including a bracketshaped guide plate overlying said support in said stock of slats, said guide plate being fixed to said support and receiving the fingers of the slats as they are transferred into said stock between itself and said support.

13. A magazine according to claim 12, wherein said transfer means are constituted by an actuator.

14. A magazine according to claim 4, wherein for each slat, said thrust plate slopes at an angle to the vertical of about 10° so that the articles slope through at least the same angle bottom edge foremost, while in said first zone.

15. A magazine according to claim 4, wherein each slat further includes a first longitudinal window through its thrust plate, said window being substantially horizontal and open to a far edge of the slat when mounted on said first zone, with an unstacking face of the unstacking head passing through said window at the end of a slat advance stroke, said unstacking head being mounted at the unstacking terminal portion of said first zone externally to said slat.

16. A magazine according to claim 4, wherein each slat further includes an oblong second window through its thrust plate and extending close to a near edge when the plate in question is on said first zone or said second zone, thereby facilitating grasping the slat by hand.

17. A magazine according to claim 5, wherein said base plates are mounted to slope relative to the horizontal through an angle of about 10°, with their near longitudinal edges being higher than their far longitudinal edges.

18. A magazine according to claim 5, further including an advance conveyor mounted in the unstacking terminal portion of said first zone and lying flush with the top face of said first base plate.

19. A magazine according to claim 18, wherein said advance conveyor imparts a speed of advance to said articles which is faster than a speed imparted thereto by the slats being driven over said first zone by said drive means.

20. A magazine according to claim 19, further including two additional detectors for controlling article advance speed, the additional detectors being mounted substantially in the terminal portion of said first zone and defining an angle relative to the vertical, one of them being intended to detect the top edges of articles and controlling a motor gear box unit including a clutch and brake and coupled to the slat drive means, while the other serves to detect the bottom edges of the articles and controls a motor coupled to said advance conveyor.

* * * * *